2,806,760
Patented Sept. 17, 1957

2,806,760
PROCESS FOR DYEING NITROGENOUS FIBERS WITH METALLIFEROUS MONOAZO DYESTUFFS

Jakob Brassel, Basel, and Arthur Buehler, Rhinefelden, Switzerland, assignors to Ciba Limited, Basel, Switzerland, a Swiss firm No Drawing. Application June 4, 1954,
Serial No. 434,668

Claims priority, application Switzerland June 10, 1953

9 Claims. (Cl. 8—42)

This invention is based on the observation that nitrogenous fibers can be dyed in a very satisfactory manner by dyeing the fibers in a weakly alkaline to weakly acid medium with a metalliferous monoazo-dyestuff, which contains one atom of metal bound in complex union to two molecules of different monoazo-dyestuffs, of which one is free from carboxylic acid groups present in a position other than an ortho-position relatively to the azo linkage and from sulfonic acid groups and the other is also free from carboxylic acid groups in a position other than an ortho-position relatively to the azo linkage and contains a single sulfonic acid group.

As examples of nitrogenous materials which can be dyed by the process of this invention there may be mentioned generally materials which owing to their nitrogen content are capable of being dyed with acid dyestuffs, such as leather, silk, synthetic fibers, especially those of superpolyamides (nylon) or superpolyurethanes and especially wool.

As dyestuffs for use in carrying out the present process there may be mentioned, for example, complex metal compounds which contain one atom of metal bound in complex union to one molecule of each of two different ortho-carboxy-ortho′-hydroxy-, ortho-hydroxy-ortho′-amino- or especially ortho:ortho′-dihydroxy-monoazo-dyestuffs of the kind referred to above. As metals capable of forming complexes there come into consideration, for example, cobalt and especially chromium.

Valuable dyeings are obtained, for example, with metalliferous dyestuffs of the following constitution:

(a) Metal compounds which contain one atom of metal bound in complex union to two molecules of different monoazo-dyestuffs, of which one is free from carboxylic acid groups present in a position other than an ortho-position relatively to the azo linkage and contains a single free, that is to say, not functionally converted, sulfonic acid group and the other is free from sulfonic acid and carboxylic acid groups, and at least one of which dyestuffs, advantageously that which is free from sulfonic acid groups, contains a sulfonic acid aryl ester group or more especially a sulfonic acid amide group or a sulfone group.

(b) Metal compounds which contain one atom of metal bound in complex union to two molecules of different monoazo-dyestuffs, both of which are free from carboxylic acid groups in a position other than an ortho-position relatively to the azo-linkage, and free from functionally converted sulfonic acid groups and sulfone groups, and of which one contains a single free sulfonic acid group and the other is free from sulfonic acid groups.

In general it is of advantage to use in the present process metalliferous dyestuffs of the aforesaid kinds which are free from substantial quantities of metal compounds which contain one atom of metal bound in complex union per molecule of dyestuff. In the case of dyestuffs which contain no functionally converted sulfonic acid groups or sulfone groups, it is of advantage to use products which are free from substantial quantities of metal compounds which contain one atom of metal bound in complex union to two molecules of the same dyestuff.

The monoazo-dyestuffs necessary for making the metal compounds to be used in the present process can be obtained, for example, from the following diazo-components and coupling components, subject to the choice of these components being made with due regard to the requirements specified above:

*Diazo-components.*—4- or 5 - chloro- 2 - amino - 1 - hydroxybenzene, 4-, or 5- or 6 - nitro - 2 - amino - 1 - hydroxybenzene, 4:6 - dichloro - 2 - amino - 1 - hydroxybenzene, 3:4:6 - trichloro - 2 - amino - 1 hydroxybenzene, 4 - chloro - 5- or - 6 - nitro - 2 - amino - 1 - hydroxybenzene, 4 - nitro - 6 - chloro- 2 - amino - 1 - hydroxybenzene, 6 - nitro - 4 - methyl - 2 - amino - 1 - hydroxybenzene, 4 - nitro - 6 - acetylamino - 2 - amino - 1- hydroxybenzene, 6 - nitro - 4 - acetylamino - 2 - amino- 1 - hydroxybenzene, 4:6 - dinitro - 2 - amino - 1 - hydroxybenzene, 1 - amino - 2 - hydroxynaphthalene, 2- aminobenzoic acid, 2 - aminobenzene - 1 - carboxylic acid- 4- or - 5 - sulfonic acid, 2 - amino - 1 - hydroxybenzene- 4- or - 5 - sulfonic acid, 4 - chloro- or 4 - methyl - 2- amino - 1 - hydroxybenzene - 5 - or - 6 - sulfonic acid, 4 - nitro - 2 - amino - 1 - hydroxybenzene - 6 - sulfonic acid, 6 - nitro - 2 - amino - 1 - hydroxybenzene - 4 - sulfonic acid, and above all naphthalene compounds such as 2 - amino - 1 - hydroxynaphthalene - 4 - or - 8 - sulfonic acid, 6 - bromo - or 6 - methyl - 1 amino - 2 - hydroxynaphthalene - 4 - sulfonic acid and especially 1 - amino- 2 - hydroxynaphthalene - 4 - sulfonic acid or 6 - nitro- 1 - amino - 2 - hydroxynaphthalene - 4 - sulfonic acid, 4 - chloro - or 4 - nitro - 2 - amino - 1 - hydroxybenzene- 6 - sulfonic acid amide, 6 - nitro - 2 - amino - 1 - hydroxybenzene - 4 - sulfonic acid amide, 2 - amino - 1 - hydroxybenzene - 4 - or - 5 - sulfonic acid amide, 2 - amino - 1- hydroxybenzene - 4 - or - 5 - sulfonic acid phenylamide, 2 - amino - 1 - hydroxybenzene - 4 - or - 5 - sulfonic acid mono - or dimethylamide, 4 - chloro - 2 - amino - 1- hydroxybenzene - 5 - sulfonic acid methylamide, ethylamide, isopropylamide or phenylamide, 4 - chloro - 2- amino - hydroxybenzene - 5 - sulfonic acid dimethylamide, diethylamide, N - β - hydroxyethy - N - phenylamide, N - methyl - N - β - hydroxyethylamide, N- methyl - N - phenyl - or N - ethyl - N - phenylamide, and the corresponding compounds, which contain instead of a sulfonic acid amide group, a methyl-sulfone group, an ethyl-sulfone group and especially a phenyl-sulfone group, a para - methyl - phenyl - or para - chlorophenyl - sulfone group.

*Coupling components.*—Hydroxybenzenes such as paracresol or paratertiary amyl-phenol, 4-methyl-2-acetylamino-1-hydroxybenzene, 4-acetylamino-1-hydroxybenzene, β - ketocarboxylic acid esters or amides such as acetoacetic acid anilide and 1 - acetoacetylamino - 2 -, - 3 - or - 4 - chlorobenzene, pyrazolones such as 1 - phenyl - 3- methyl - 5 - pyrazolones, 1 : 3 - diphenyl - 5 - pyrazolone, 1 - (2′ -, 3′- or 4′- chlorophenyl) - 3 - methyl - 5 - pyrazolone, 1 - (2′-, 3′- or 4′ - methyl - phenyl) - 3 - methyl- 5 - pyrazolone, 1 - (2′:5′ - dichlorophenyl) - 3 - methyl- 5 - pyrazolone, 1 - (naphthyl - (1′) - or - (2′) - 3 - methyl) - 5 - pyrazolone, 1 - (2′ - ethyl - or 4′ - ethylphenyl) - 3 - methyl - 5 - pyrazolone, 1 - phenyl - 5- pyrazolone - 3 - carboxylic acid phenylamide, 1 - n- octyl - 3 - methyl - 5 - pyrazolone, hydroxyquinolines, barbituric acids and naphthylamines such as 6 - bromo -, 6 - methoxy - or 6 - methyl - 2 - aminonaphthalene, 2- phenylaminonaphthalene, 2 - aminonaphthalene itself and 2 - aminonaphthalene - 1 - sulfonic acid which is known to couple to form the same dyestuffs as 2 - aminonaphthalene with the splitting off of the —SO₃H group in the 1-position, and also naphthols such as 6 - bromo - or 6- methoxy-2-hydroxynaphthalene and especially 1-acetylamino - 7 - hydroxynaphthalene, 1 - n - butyryl - amino-
7 - hydroxynaphthalene, 1 - benzoylamino - 7 - hydroxynaphthalene, 1 - carbethoxyamino - 7 - hydroxynaphthalene, 8 - chloro - 1 - hydroxynaphthalene, 5 - chloro-
1 - hydroxynaphthalene, 5 : 8 - dichloro - 1 - hydroxynaphthalene, 4:8 - or 5:8 - dichloro - 2 - hydroxynaphthalene, 2 - hydroxynaphthalene and, if desired, 1 - hydroxynaphthalene, 1 - phenyl - 3 - methyl - 5 - pyrazolone - 2' -, - 3' - or - 4' - sulfonic acid, 2' - chloro - 1-phenyl - 3 - methyl - 5 -pyrazolone - 4' - or - 5' - sulfonic acid, 2':5' - dichloro - 1 - phenyl - 3 - methyl - 5-pyrazolone - 4' - sulfonic acid, 1 - (naphthyl - (1') ) - 3-methyl - 5 - pyrazolone -4'-, -5'-, -6'-, -7'-, or -8' - sulfonic acid, 1 - (naphthyl - (2') ) - 3 - methyl - 5 - pyrazolone - 6' - or - 8' - sulfonic acid, 1 - acetoacetylaminobenzene - 4 - sulfonic acid, and above all 2 - amino - or
2 - hydroxy - naphthalene - 4 -, - 5 - or - 6 - or - 7 - sulfonic acid, 1 - hydroxynaphthalene - 4-, - 5- or - 8 - sulfonic acid, 2 - phenylaminonaphthalene - 3'- or - 4' - sulfonic acid, 1 - phenyl - 3 - methyl - 5 - pyrazolone - 3'-sulfonic acid amide or - 3' - sulfonic acid methylamide, amides of 2 - aminonaphthalene - 4-, - 5- or - 6 - sulfonic acid, of 1 - hydroxynaphthalene - 4 -, - 5 - or - 8 - sulfonic acid or of 2-hydroxynaphthalene-4-, -5-, -6- or
- 7 - sulfonic acid.

The dyestuffs used in the present process can be made by treating a mixture of two different metallizable monoazo-dyestuffs, obtainable for example, from the components mentioned above, one of which dyestuffs is free from carboxylic acid groups in a position other than an ortho-position relatively to the azo linkage and from sulfonic acid groups and the other is also free from carboxylic acid groups in a position other than an ortho-position relatively to the azo linkage and contains a single sulfonic acid group, with an agent yielding metal in such manner that the resulting metalliferous dyestuff contains one atom of metal bound in complex union with two molecules of different monoazo-dyestuffs (1:2-complex).

Another method of making the dyestuffs to be used in the present process consists in reacting in a molecular ratio of about 1:1 a metallizable metal-free monoazo-dyestuff and a complex metal compound of a monoazo-dyestuff, which contains one atom of metal in complex union per molecule of dyestuff, (1:1-complex), and so choosing the starting materials that they are both free from carboxylic acid groups in a position other than an ortho-position relatively to the azo linkage and one of them, advantageously the complex metal compound, contains a single free sulfonic acid group and the other is free from sulfonic acid groups.

The method first mentioned above is generally very well suited for making the dyestuffs of the type (a) mentioned above, while the second of the methods described above is especially suitable for making the dyestuffs of the type (b) mentioned above.

In carrying out the method first mentioned above it is generally of advantage to treat a mixture of one molecular proportion of each of two different dyestuffs with a quantity of an agent yielding metal corresponding to about one atomic proportion of metal and/or to carry out the metallization in a weakly acid to alkaline medium. Accordingly, there are especially suitable for carrying out the process those agents yielding metal which are stable in alkaline media, for example, cobalt compounds and especially chromium compounds of aliphatic hydroxy-carboxylic acids or dicarboxylic acids or aromatic ortho-hydroxy-carboxylic acids, which contain the metal in complex union. As examples of aliphatic hydroxy-carboxylic acids there may be mentioned, inter alia, lactic acid, citric acid and especially tartaric acid, and as a dicarboxylic acid there may be mentioned oxalic acid and among the aromatic hydroxy-carboxylic acids there may be mentioned those of the benzene series such as, 4-, 5- or 6-methyl-1-hydroxybenzene-2-carboxylic acid and above all 1-hydroxybenzene-2-carboxylic acid itself. As agents yielding cobalt, however, there are advantageously used simple cobalt salts, such as cobalt sulfate, cobalt acetate or, if desired, freshly precipitated cobalt hydroxide.

The conversion of the dyestuffs into the complex metal compounds is advantageously carried out at a raised temperature, under atmospheric or superatmospheric pressure, for example, at the boiling temperature of the reaction mixture, if desired in the presence of suitable additions, for example in the presence of salts of organic acids, bases, organic solvents or other agents assisting the formation of complexes.

The 1:1-complexes used as starting materials in the method second mentioned above can be obtained by methods in themselves known, for example, by reacting the monoazo-dyestuffs free from complex-forming metal, advantageously the dyestuff which contains the sulfonic acid group, in an acid medium with an excess of a salt of the appropriate metal, for example a cobalt salt or advantageously a salt of trivalent chromium, such as chromium formate, chromium sulfate or chromium fluoride, at the boiling temperature, or, if desired, at a temperature above 100° C. For converting the metal-free dyestuffs free from sulfonic acid groups into the 1:1-complexes it is generally of advantage to carry out the metallization in known manner, for example, in the presence of an organic solvent such as alcohol or formamide.

In general it is of advantage, after preparing and separating the starting materials necessary for making the 1:2-complexes, not to dry them but to use them in the form of moist pastes.

The reaction of the 1:1-metal complexes with the metal-free dyestuffs is advantageously carried out in an aqueous neutral to weakly alkaline medium, in an open vessel or a closed vessel, at the ordinary or a raised temperature, for example at a temperature within the range of 50–120° C. It is generally desirable to react together substantially equivalent quantities of the metalliferous 1:1-complex and metal-free dyestuff, the molecular ratio of the metal-free dyestuff and the 1:1-complex advantageously being at least 0.85:1 and at most 1:0.85. An excess of the metalliferous dyestuff usually has a less disadvantageous effect than an excess of the metal-free dyestuff. Generally speaking, the closer the ratio is to 1:1 the more advantageous is the result.

When the products so obtained still contain a detectable quantity of the 1:1-complex used as starting material, for example, about 0.1 mol of the 1:1-complex per mol of the 1:2-complex obtained as final product, it is generally desirable subsequently to convert this excess into a 1:2-complex.

There may be after-treated in an analogous manner products which contain an excess of the metal-free dyestuff, by adding after the reaction a metallizable monoazo-dyestuff in a quantity which is at least equimolecular with respect to the excess of the metal-free dyestuff, and treating the whole with an agent mentioned above as being suitable for the production of 1:2-complexes.

The dyeing process of this invention is carried out in a weakly alkaline to weakly acid bath, advantageously in a bath of which the pH value is within the range of 8–5. Especially good results are usually obtained in dyebaths having a pH value within the range of 7–6. The pH can be adjusted to the desired value in known manner by means of a suitable addition, for example, a weak acid, such as acetic acid.

It may also be of advantage to cause the pH value of the dyebath to fall somewhat within the aforesaid limits during the dyeing process. A suitable method for causing the pH value to fall during the dyeing, is to add to the dyebath a substance which, like some ammonium salts, undergoes decomposition during the dyeing process into a volatile basic constituent and an acid constituent which remains in the dyebath. As an example there may be mentioned ammonium acetate.

In other respects the dyeing process can be carried out in known manner advantageously at a raised temperature, if desired, at an increasing temperature, or in a closed vessel under pressure at a temperature exceeding 100° C. There may also be used the usual additions such as sodium sulfate, condensation products of ethylene oxide with amines or alcohols.

In the dyebaths of the above kind the dyestuffs used in the present process are easily soluble and possess a very good absorbent capacity with respect to nitrogenous fibers. The dyeing process can be easily controlled and the regulation of shade, for which, for example, dyestuffs of the same kind or different dyestuffs capable of being absorbed from weakly alkaline to weakly acid baths, affords no difficulty. The dyeings so produced are distinguished by their level character, and also by their good fastness to light, washing, fulling, decatizing and carbonizing. Furthermore, the feel of the material is maintained after the dyeing process.

In some cases, especially in producing deep shades, it may be of advantage to subject the material dyed by the present process to an after-treatment with steam (decature).

The following examples illustrate the invention the parts and percentages being by weight, and "1 mol" denoting, as is usual, the number of grams corresponding to the molecular weight. It will be understood that the quantities may be increased, for example, to 10 or 1000 times the values given. If the dyestuff used as starting material is not in a pure form, for example, if it is not a closely defined dyestuff acid or dyestuff salt, but contains, for example as the result of precipitation by salting out foreign substances which do not adversely affect the present reaction, the dyestuffs can normally be used in this form with good result. However, in this case it is desirable to determine the content of pure dyestuff by one of the known methods, for example, by titration of the azo group.

*Example 1*

2 parts of the metalliferous dyestuff, which contains 1 molecule of the monoazo-dyestuff from diazotized 1-amino-2-hydroxynaphthalene-4-sulfonic acid and 2-hydroxynaphthalene and 1 molecule of the monoazo-dyestuff from diazotized 4-chloro-2-amino-1-hydroxybenzene-5-sulfonic acid methylamide and 2-hydroxynaphthalene in complex union with 1 atom of chromium, are dissolved in 4000 parts of water, and 100 parts of well wetted wool are entered into the resulting dyebath at 40–50° C. 1 part of acetic acid of 40 percent strength is then added, the bath is raised to the boil in the course of ½ hour and dyeing is carried on for 1 hour at the boil. Finally the wool is rinsed with cold water and dried. The wool is dyed navy blue, and the dyeing is distinguished by its level character and good fastness to washing, fulling, light, decatizing and carbonizing.

A navy blue dyeing is also produced when no acetic acid is added to the dyebath, and when superpolyamide fibers (nylon), are dyed in the manner described above, instead of wool.

The metalliferous dyestuff used in this example may be prepared as follows:

0.01 mol of the dyestuff from diazotized 1-amino-2-hydroxynaphthalene-4-sulfonic acid and 2-hydroxynaphthalene is boiled with 0.01 mol of the dyestuff from diazotized 4-chloro-2-amino-1-hydroxybenzene-5-sulfonic acid methylamide and 2-hydroxynaphthalene in 400 cc. of water with the addition of 2 cc. of a 10 N-solution of sodium hydroxide and 30 grams of a solution of sodium chromosalicylate having a chromium content of 2.6 percent for one hour under reflux. If required, small amounts of impurities are filtered off. The chromium complex formed is precipitated from the solution by the addition of 60 grams of sodium chloride, filtered off and dried.

Further valuable dyeings are produced on wool and on nylon in the manner described above with the metalliferous dyestuffs given in the following table, in which columns I and II give the two monoazo-dyestuffs from which the 1:2-chromium complex can be prepared in the manner described in the preceding paragraph:

| | I | II | III |
|---|---|---|---|
| 1 | 1-amino-2-hydroxynaphthalene-4-sulfonic acid+8-chloro-1-hydroxynaphthalene. | 2-amino-1-hydroxybenzene-5-sulfonic acid amide+5:8-dichloro-1-hydroxynaphthalene. | blue. |
| 2 | 1-amino-2-hydroxynaphthalene-4-sulfonic acid+5:8-dichloro-1-hydroxynaphthalene. | ...do... | Do. |
| 3 | 1-amino-2-hydroxynaphthalene-4-sulfonic acid+1-hydroxynaphthalene. | ...do... | Do. |
| 4 | 2-amino-1-hydroxynaphthalene-8-sulfonic acid+5:8-dichloro-1-hydroxynaphthalene. | 2-amino-1-hydroxybenzene-4-sulfonic acid amide+5:8-dichloro-1-hydroxynaphthalene. | Do. |
| 5 | 4-nitro-2-amino-1-hydroxybenzene-6-sulfonic acid+6-methoxy-2-hydroxynaphthalene. | 2-amino-1-hydroxybenzene-5-sulfonic acid amide+5:8-dichloro-1-hydroxynaphthalene. | blue-grey. |
| 6 | 6-nitro-1-amino-2-hydroxynaphthalene-4-sulfonic acid+2-hydroxynaphthalene. | 2-amino-1-hydroxybenzene-4-sulfonic acid methylamide+2-hydroxynaphthalene. | violet brown. |
| 7 | 4-nitro-2-aminophenol-6-sulfonic acid ⟶ 1-phenyl-3-methyl-5-pyrazolone. | 2-aminophenol-4-phenylsulfone ⟶ acetoacetic acid anilide. | orange. |
| 8 | 6-nitro-2-hydroxy-1-aminonaphthalene-4-sulfonic acid ⟶ β-naphthol. | 2-aminophenol-4-methylsulfone ⟶ 1-carbomethoxyamino-7-hydroxynaphthalene. | grey. |
| 9 | 4-nitro-2-aminophenol-6-sulfonic acid ⟶ 1-phenyl-3-methyl-5-pyrazolone. | 4-chloro-2-aminophenol ⟶ 2-hydroxynaphthalene-6-sulfonic acid phenyl ester. | red-brown. |
| 10 | 2-aminobenzoic acid ⟶ 1-phenyl-3-methyl-5-pyrazolone-4'-sulfonic acid. | 2-aminophenol-4-sulfamide ⟶ 5:8-dichloro-1-hydroxynaphthalene. | grey. |
| 11 | ...do... | 2-aminophenol-5-sulfamide ⟶ 5:8-dichloro-1-hydroxynaphthalene. | Do. |
| 12 | ...do... | 4-nitro-2-aminophenol-6-sulfamide ⟶ 4-tert.amyl-1-hydroxybenzene. | beige. |
| 13 | 5-nitro-2-aminophenol ⟶ 2-aminonaphthalene-6-sulfonic acid. | 2-amino-1-hydroxybenzene-4-sulfonic acid isopropylamide ⟶ acetic acid anilide. | yellowish olive. |

*Example 2*

100 parts of wool or nylon are dyed in the manner described in Example 1 with 2 parts of the mixture of metalliferous dyestuffs prepared in the manner described below. There is obtained a level blue dyeing which is fast to washing and light.

0.006 mol of the dyestuff from diazotized 1-amino-2-hydroxynaphthalene-4-sulfonic acid and 2-hydroxynaphthalene are boiled under reflux for one hour with 0.004 mol of the dyestuff from diazotized 1-amino-2-hydroxynaphthalene 4-sulfonic acid and 5:8-dichloro-1-hydroxynaphthalene and with 0.01 mol of the dyestuff from diazotized 4-chloro-2-amino-1-hydroxybenzene-5-sulfonic acid methylamide and 2-hydroxynaphthalene in 400 cc. of water with the addition of 2 cc. of a 10 N-solution of sodium hydroxide and 30 grams of a solution of sodium chromosalicylate having a chromium content of 2.6 percent. If required, the mixture may be filtered to remove a small amount of impurities. The chromiferous dyestuff is precipitated from the solution by the addition of 60 grams of sodium chloride, filtered off and dried.

Example 3

A level blue dyeing which is fast to washing, fulling and light is produced by dyeing wool or nylon in the manner described in Example 1 with the mixture of metalliferous dyestuffs obtained in the following manner:

0.009 mol of the dyestuff from diazotized 1-amino-2-hydroxynaphthalene - 4 - sulfonic acid and 5:8 - dichloro-1-hydroxynaphthalene are boiled under reflux for 1 hour with 0.005 mol of the dyestuff from diazotized 2-amino-1-hydroxybenzene-4-sulfonic acid methylamide and 2-hydroxynaphthalene and with 0.005 mol of the dyestuff from diazotized 4 - chloro - 2 - amino - 1 - hydroxybenzene - 5-sulfonic acid methylamide and 2-hydroxynaphthalene in 400 cc. of water with the addition of 2 cc. of a 10 N-solution of sodium hydroxide and 30 grams of a solution of chromosalicylate having a chromium content of 2.6 percent. If required, the mixture is filtered to remove a small amount of impurities. The resulting chromiferous dyestuff is precipitated from the solution by the addition of 60 grams of sodium chloride, filtered off and dried.

Example 4

4 parts of the metalliferous dyestuff, which contains 1 molecule of the monoazo-dyestuff from nitrated 1-diazo-2 - hydroxynaphthalene - 4 - sulfonic acid and 2 - hydroxynaphthalene and 1 molecule of the monoazo-dyestuff from diazotized 5 - nitro - 2 - amino - 1 - hydroxybenzene and 2-hydroxy-naphthalene bound in complex union to 1 atom of chromium, are dissolved in 4000 parts of water, and 100 parts of well wetted wool are entered into the resulting dyebath at 40–50° C. There is then added 1 part of acetic acid of 40 percent strength, the bath is raised to the boil in the course of ½ hour and dyeing is carried on at the boil for 2 hours. Finally the wool is rinsed with cold water and dried. The wool is dyed black, and the dyeing is distinguished by its good fastness to light and washing.

A black dyeing is likewise obtained when no acetic acid is added to the dyebath, and when superpolyamide fibers (nylon fibers) are dyed in the same manner, instead of wool.

The 1:2-complex mentioned above may be prepared as follows:

0.01 mol of the chromium complex of the dyestuff from nitrated 1 - diazo - 2 - hydroxynaphthalene - 4 - sulfonic acid and 2-hydroxynaphthalene, containing 1 atom of chromium in complex union with 1 molecule of dyestuff, is heated at 90° C. with 0.01 mol of the dyestuff from diazotized 5 - nitro - 2 - amino - 1 - hydroxybenzene and 2-hydroxynaphthalene in 200 cc. of water with the addition of 10 cc. of a 2 N-solution of sodium carbonate, and the whole is maintained at 90–100° C. for one hour. The reaction mixture is then evaporated to dryness.

In the following table are given a few further chromiferous dyestuffs (1:2-complexes), which are obtained by reacting in the molecular ratio 1:1 the chromium-free dyestuff mentioned in column I with the 1:1-chromium complex given in column II in the manner described in the preceding paragraph. Wool or nylon can be dyed with these 1:2-complexes in the manner described above to produce the tints given in column III. The dyeings are distinguished by their level character and also their good fastness to light and properties of wet fastness.

| | I<br>Chromium-free dyestuff from— | II<br>Chromiferous dyestuff (1:1-complex) from— | III<br>Tint on wool |
|---|---|---|---|
| 1 | 4-nitro-2-amino-1-hydroxybenzene + 2-hydroxynaphthalene. | 4-nitro-2-amino-1-hydroxybenzene-6-sulfonic acid + 1-phenyl-3-methyl-5-pyrazolone. | brown. |
| 2 | 5-nitro-2-amino-1-hydroxybenzene + 2-hydroxynaphthalene. | 4-chloro-2-amino-1-hydroxybenzene + 1 - hydroxynaphthalene - 5 - sulfonic acid. | navy blue. |
| 3 | 4-nitro-6-chloro-2-amino-1-hydroxybenzene + 2-hydroxynaphthalene. | 4-nitro-2-amino-1-hydroxybenzene-6-sulfonic acid + 1-phenyl-3-methyl-5-pyrazolone. | brown. |
| 4 | 4-nitro-2-amino-1-hydroxybenzene + 1-phenyl-3-methyl-5-pyrazolone. | 4-nitro-2-amino-1-hydroxybenzene-6-sulfonic acid + 2 - hydroxynaphthalene. | Do. |
| 5 | 4-nitro-2-amino-1-hydroxybenzene + 1 - (4' - chlorophenyl) - 3 - methyl - 5 - pyrazolone. | ....do.... | Do. |
| 6 | 4-nitro-6-chloro-2-amino-1-hydroxybenzene + 1 - phenyl - 3 - methyl - 5 - pyrazolone. | ....do.... | Do. |
| 7 | 4-chloro-2-amino-1-hydroxybenzene + 2-hydroxy-naphthalene. | 5-nitro-2-amino-1-hydroxybenzene + 2 - amino - naphthalene - 6 - sulfonic acid. | grey. |
| 8 | 4-nitro-6-chloro-2-amino-1-hydroxybenzene + 4-n-butyrylamino-1-hydroxybenzene. | 4-nitro-2-amino-1-hydroxybenzene-6-sulfonic acid + 2 - hydroxynaphthalene. | brownish grey. |
| 9 | 4-chloro-2-amino-1-hydroxybenzene + 5:8-dichloro-1-hydroxynaphthalene. | 1-amino-2-hydroxynaphthalene-4-sulfonic acid + 2-hydroxynaphthalene. | navy blue. |
| 10 | 5-nitro-2-amino-1-hydroxybenzene + 2-hydroxynaphthalene. | ....do.... | Do. |
| 11 | 5-nitro-2-amino-1-hydroxybenzene + 1-phenyl-3-methyl-5-pyrazolone. | 1-amino-2-hydroxynaphthalene-4-sulfonic acid + 1 - phenyl - 3 - methyl - 5 - pyrazolone. | bluish red. |
| 12 | 4-chloro-6-nitro-2-amino-1-hydroxybenzene + 1 - phenyl - 3 - methyl - 5 - pyrazolone. | 4-chloro-2-amino-1-hydroxybenzene-6-sulfonic acid + 1-phenyl-3-methyl-5-pyrazolone. | red. |
| 13 | 4-chloro-2-amino-1-hydroxybenzene + β-naphthol. | 1 - amino - 2 - hydroxynaphthalene - 4 - sulfonic acid + 5:8 - dichloro - 1 - hydroxynaphthalene. | navy blue. |
| 14 | 4-chloro-2-amino-1-hydroxybenzene + 5:8-dichloro-1-hydroxynaphthalene. | ....do.... | Do. |
| 15 | 4-nitro-6-chloro-2-amino-1-hydroxybenzene + 4-tertiary amyl-1-hydroxybenzene. | 4-nitro-2-aminophenol-6-sulfonic acid + 2-hydroxynaphthalene. | black brown. |
| 16 | 5-nitro-2-amino-1-hydroxybenzene + 2-hydroxynaphthalene. | 1 - amino - 2 - hydroxynaphthalene - 4 - sulfonic acid + 5:8 - dichloro - 1 - hydroxynaphthalene. | navy blue. |
| 17 | 2-aminobenzoic acid + 1 - (2'-ethylphenyl)-3-methyl-5-pyrazolone. | 5-nitro-2-amino-1-hydroxybenzene + 2 - aminonaphthalene - 6 - sulfonic acid. | green. |
| 18 | 4:6-dinitro-2-amino-1-hydroxybenzene + 2-hydroxynaphthalene. | 6-nitro-2-hydroxy-1-aminonaphthalene - 4 - sulfonic acid + 2 - hydroxynaphthalene. | grey. |

Example 5

100 parts of wool or nylon are dyed in the manner described in Example with 4 parts of the metalliferous dyestuff obtained as described below. There is produced a level black dyeing which is fast to washing, fulling and light.

0.01 mol of the chromium complex of the dyestuff from nitrated 1-diazo-2-hydroxynaphthalene-4-sulfonic acid and 2-hydroxynaphthalene, containing one atom of chromium in complex union with one molecule of dyestuff, is heated at 95–100° C. with 0.009 mol of the dyestuff from diazotized 5-nitro-2-amino-1-hydroxybenzene and 2-hydroxynaphthalene in 200 cc. of water with the addition of 10 cc. of a 2 N-solution of sodium carbonate, and the whole is maintained at that temperature for 30 minutes. After the addition of a solution of 0.002 mol of the dyestuff from diazotized 2-amino-1-hydroxybenzene-5'-sulfonic acid amide and 5:8-dichloro-1-hydroxynaphthalene in 100 cc. of hot water, the reaction mixture is heated to 100° C. and maintained at that temperature for 30 minutes. 5 grams of a solution of sodium chromosalicylate having a chromium content of 2.6 percent are then added. The reaction mixture is boiled for one hour under reflux and then evaporated to dryness in vacuo.

*Example 6*

0.01 mol of the complex chromium compound containing 1 molecule of dyestuff bound in complex union with 1 atom of chromium and obtained from the dyestuff from diazotized 1-amino-2-hydroxynaphthalene-4-sulfonic acid and 5:8-dichloro-1-hydroxynaphthalene is heated to 75° C. with 0.01 mol of the dyestuff from diazotized 2-aminobenzoic acid and 1-(2'-ethyl phenyl)-3-methyl-5-pyrazolone in 400 cc. of water with the addition of 10 cc. of a 2 N-solution of sodium hydroxide, and then the whole is stirred for one hour at 75–80° C. and for 4 hours at 85–90° C. The complex chromium compound so formed is precipitated from the reaction mixture by the addition of 40 grams of sodium chloride, filtered off, washed with 500 cc. of sodium chloride solution of 10 percent strength and dried.

4 parts of the dyestuff so obtained and 4 parts of ammonium acetate are dissolved in 4000 parts of water. Into the dyebath so obtained are entered at 50° C. 100 parts of well wetted wool, the bath is raised to the boil in the course of ½ hour and dyeing is carried on at the boil for ¾ hour. The material is then rinsed with cold and a green level dyeing is obtained.

A green dyeing is also obtained according to this process by using a cobalt complex compound prepared as follows:

0.01 mol of the dyestuff obtained from diazotized 5-nitro-2-amino-1-hydroxybenzene and 2-aminonaphthalene-6-sulfonic acid is heated at 75° C. with 0.01 mol of the dyestuff obtained from diazotized 2-amino-1-hydroxybenzene-4-sulfonic acid isopropylamide and acetic acid anilide in 400 cc. of water with the addition of 12 cc. of a 2 N-solution of sodium hydroxide. After adding a solution of 0.011 mol of cobalt acetate in 50 cc. of water the reaction mixture is heated to 75° C. and then stirred for an hour at 75–80° C. If required the mixture is filtered to remove a small amount of impurities. The cobalt complex formed is separated from the solution by the addition of 70 g. of sodium chloride, filtered and dried.

*Example 7*

4 parts of the dyestuff used in Example 6, second paragraph, are dissolved in 4000 parts of water, and 100 parts of wool are entered into the dyebath at 60° C. The whole is brought to 110° C. in the course of 20 minutes in a pressure dyeing apparatus and maintained at that temperature for ¼ hour. After cooling, the wool is rinsed with cold water and dried. There is obtained a level green dyeing.

What we claim is:

1. A process for dyeing nitrogenous material which owing to its nitrogen content is capable of being dyed with acid dyestuffs, which process comprises dyeing the material in an aqueous weakly alkaline to weakly acid medium with a metalliferous monoazo dyestuff which contains one atom of metal bound in complex union to 2 molecules of different monoazo dyestuffs both of which dyestuffs are free from carboxylic acid groups in a position other than an ortho-position relatively to the azo linkage and contain together a single sulfonic acid group.

2. A process for dyeing nitrogenous material which owing to its nitrogen content is capable of being dyed with acid dyestuffs, which process comprises dyeing the material in an aqueous medium at a pH of 5.0 to 8.0 with a complex metal compound containing one atom of one of the metals selected from the group consisting of cobalt and chromium in complex union with two molecules of different monoazo dyestuffs selected from the group consisting of an ortho:ortho'-dihydroxy monoazo dyestuff, an ortho-carboxy-ortho'-hydroxy monoazo dyestuff, and an ortho:hydroxy-ortho'-amino monoazo dyestuff, both dyestuffs being free from further carboxylic acid groups and containing together a single free sulfonic acid group.

3. A process for dyeing nitrogenous material which owing to its nitrogen content is capable of being dyed with acid dyestuffs, which process comprises dyeing the material in an aqueous medium at a pH of 5.0 to 8.0 with a complex chromium compound containing one atom of chromium in complex union with two molecules of different ortho:ortho'-dihydroxy monoazo dyestuffs free from carboxylic acid groups, which contain together as sole group containing sulfur a single free sulfonic acid group.

4. A process for dyeing nitrogenous material which owing to its nitrogen content is capable of being dyed with acid dyestuffs, which process comprises dyeing the material in an aqueous medium at a pH of 5.0 to 8.0 with a complex chromium compound containing one atom of chromium in complex union with two molecules of different ortho:ortho'-dihydroxy monoazo dyestuffs free from carboxylic acid groups, of which one contains a single free sulfonic acid group, the other being free from such groups and containing a member of the group consisting of a sulfone group and a sulfonic acid amide group.

5. The process for dyeing wool wherein wool is dyed in an aqueous medium at a pH of 6.0 to 7.0 with a complex chromium compound containing one atom of chromium bound in complex union to one molecule of each of the two dyestuffs of the formulae

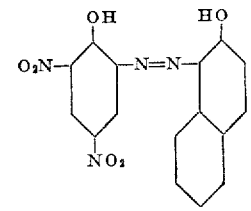

and

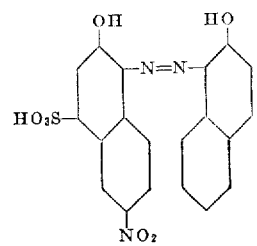

6. The process for dyeing wool wherein wool is dyed in an aqueous medium at a pH of 6.0 to 7.0 with a complex chromium compound containing one atom of chromium bound in complex union to one molecule of each of the two dyestuffs of the formulae

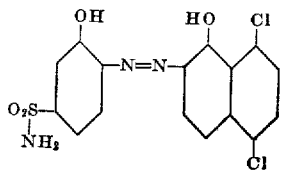

and

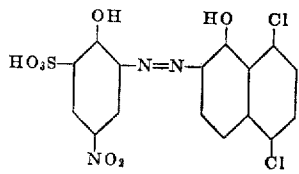

7. The process for dyeing wool wherein wool is dyed in an aqueous medium at a pH of 6.0 to 7.0 with a complex chromium compound containing one atom of chromium bound in complex union to one molecule of each of the two dyestuffs of the formulae

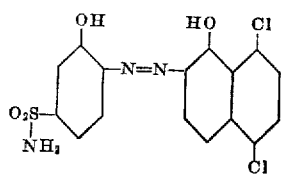

and

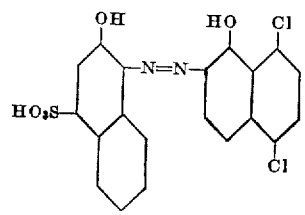

8. The process for dyeing wool wherein wool is dyed in an aqueous medium at a pH of 6.0 to 7.0 with a complex chromium compound containing one atom of chromium bound in complex union to one molecule of each of the two dyestuffs of the formulae

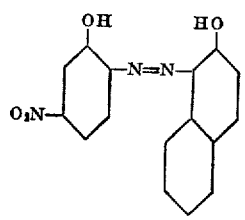

and

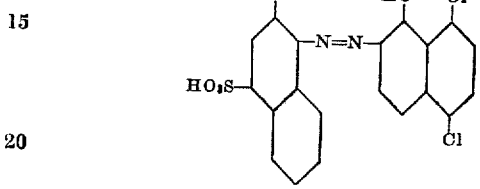

9. The process for dyeing wool wherein wool is dyed in an aqueous medium at a pH of 6.0 to 7.0 with a complex chromium compound containing one atom of chromium bound in complex union to one molecule of each of the two dyestuffs of the formulae

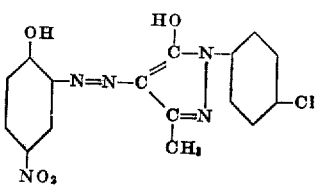

and

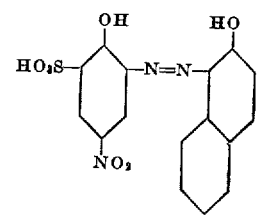

References Cited in the file of this patent
UNITED STATES PATENTS

| | | |
|---|---|---|
| 1,887,603 | Straub | Nov. 15, 1932 |
| 1,990,257 | Straub | Feb. 5, 1935 |
| 2,674,515 | Widmer | Apr. 6, 1954 |

UNITED STATES PATENT OFFICE
CERTIFICATE OF CORRECTION

Patent No. 2,806,760

Jakob Brassel et al.

September 17, 1957

It is hereby certified that error appears in the printed specification of the above numbered patent requiring correction and that the said Letters Patent should read as corrected below.

Column 8, line 72, after "Example" insert -- 4 --; column 9, line 41, after "cold" insert -- water --.

Signed and sealed this 19th day of November 1957.

(SEAL)

Attest:
KARL H. AXLINE
Attesting Officer

ROBERT C. WATSON
Commissioner of Patents